(12) United States Patent
Kizer et al.

(10) Patent No.: US 7,275,171 B2
(45) Date of Patent: Sep. 25, 2007

(54) METHOD AND APPARATUS FOR PROGRAMMABLE SAMPLING CLOCK EDGE SELECTION

(75) Inventors: Jade M. Kizer, Mountain View, CA (US); Benedict C. Lau, San Jose, CA (US); Bradley A. May, San Jose, CA (US)

(73) Assignee: Rambus Inc., Los Altos, CA (US)

( * ) Notice: Subject to any disclaimer, the term of this patent is extended or adjusted under 35 U.S.C. 154(b) by 458 days.

(21) Appl. No.: 10/443,297

(22) Filed: May 22, 2003

(65) Prior Publication Data

US 2004/0236977 A1 Nov. 25, 2004

(51) Int. Cl.
*H04L 7/00* (2006.01)
(52) U.S. Cl. ............... 713/400; 713/401; 713/500; 713/501; 713/502; 713/503; 713/600; 713/601
(58) Field of Classification Search ......... 713/400, 713/401, 500, 501, 502, 503
See application file for complete search history.

(56) References Cited

U.S. PATENT DOCUMENTS

| | | | |
|---|---|---|---|
| 5,742,798 A | 4/1998 | Goldrian | |
| 6,393,502 B1 * | 5/2002 | Meyer et al. | 710/58 |
| 6,396,887 B1 | 5/2002 | Ware et al. | |
| 6,473,439 B1 | 10/2002 | Zerbe et al. | |
| 6,584,575 B1 * | 6/2003 | Meyer et al. | 713/400 |
| 6,668,292 B2 * | 12/2003 | Meyer et al. | 710/61 |
| 6,898,725 B2 * | 5/2005 | Kark et al. | 713/502 |
| 6,910,145 B2 * | 6/2005 | MacLellan et al. | 713/400 |
| 6,954,872 B2 * | 10/2005 | Parikh | 713/500 |
| 6,961,863 B2 * | 11/2005 | Davies et al. | 713/500 |

FOREIGN PATENT DOCUMENTS

JP 02000035831 A 2/2000

* cited by examiner

*Primary Examiner*—A. Elamin
(74) *Attorney, Agent, or Firm*—Vierra Magen Marc & DeNiro LLP

(57) ABSTRACT

A method and apparatus for transferring data across a clock domain boundary is described. In one embodiment, a fixed relationship between a faster clock and a slower clock is maintained in the process of phase alignment to allow great flexibility in allowable combinations of slower clock and faster clock frequencies. In one embodiment, an encoded edge select word is generated once at system initialization and used thereafter to select edges of the faster clock on which to sample data that comes from the clock domain of the slower clock. The value of the encoded edge select word is based, in part, on the fixed relationship between the faster clock and the slower clock.

22 Claims, 15 Drawing Sheets

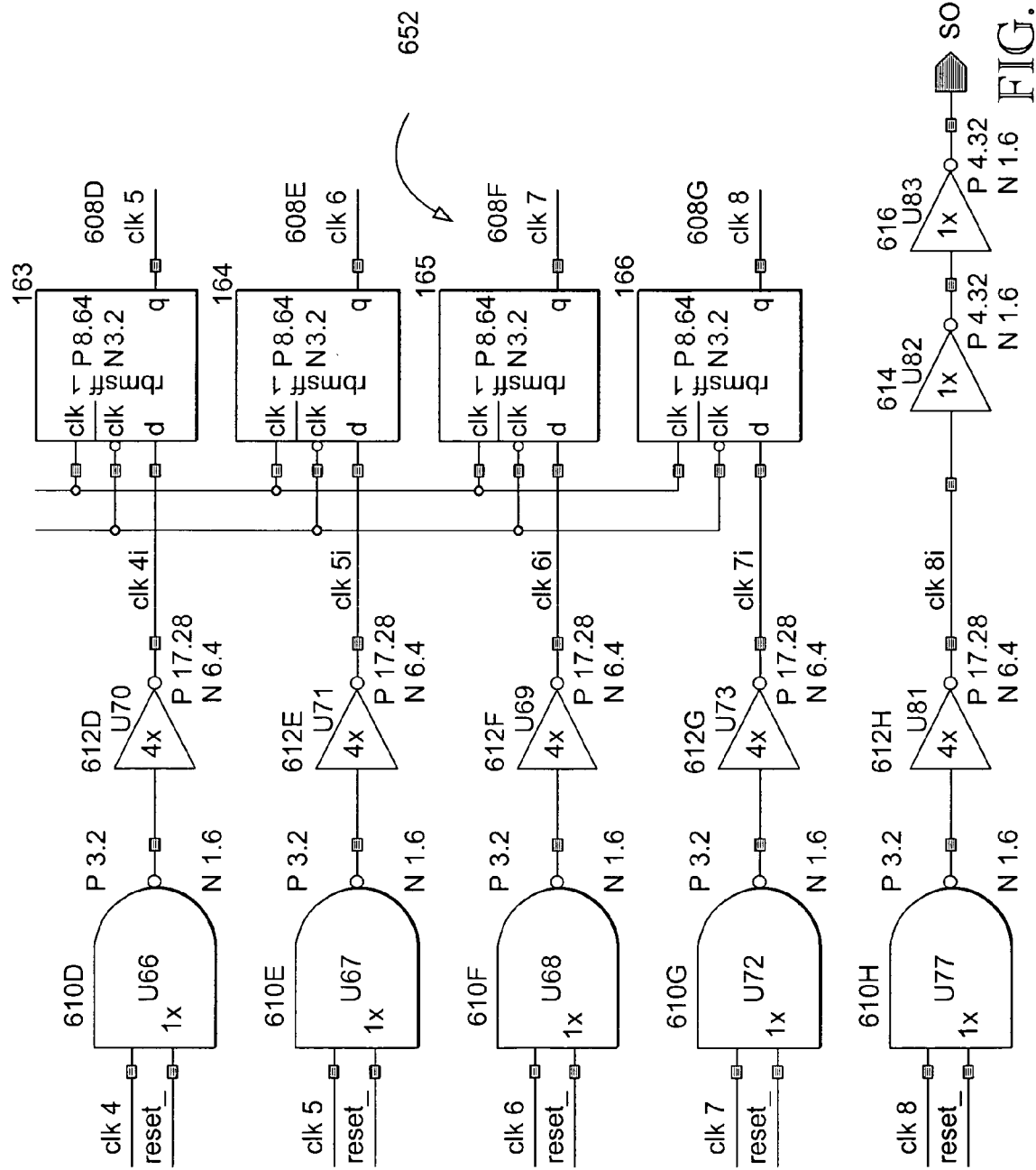
FIG. 6A1

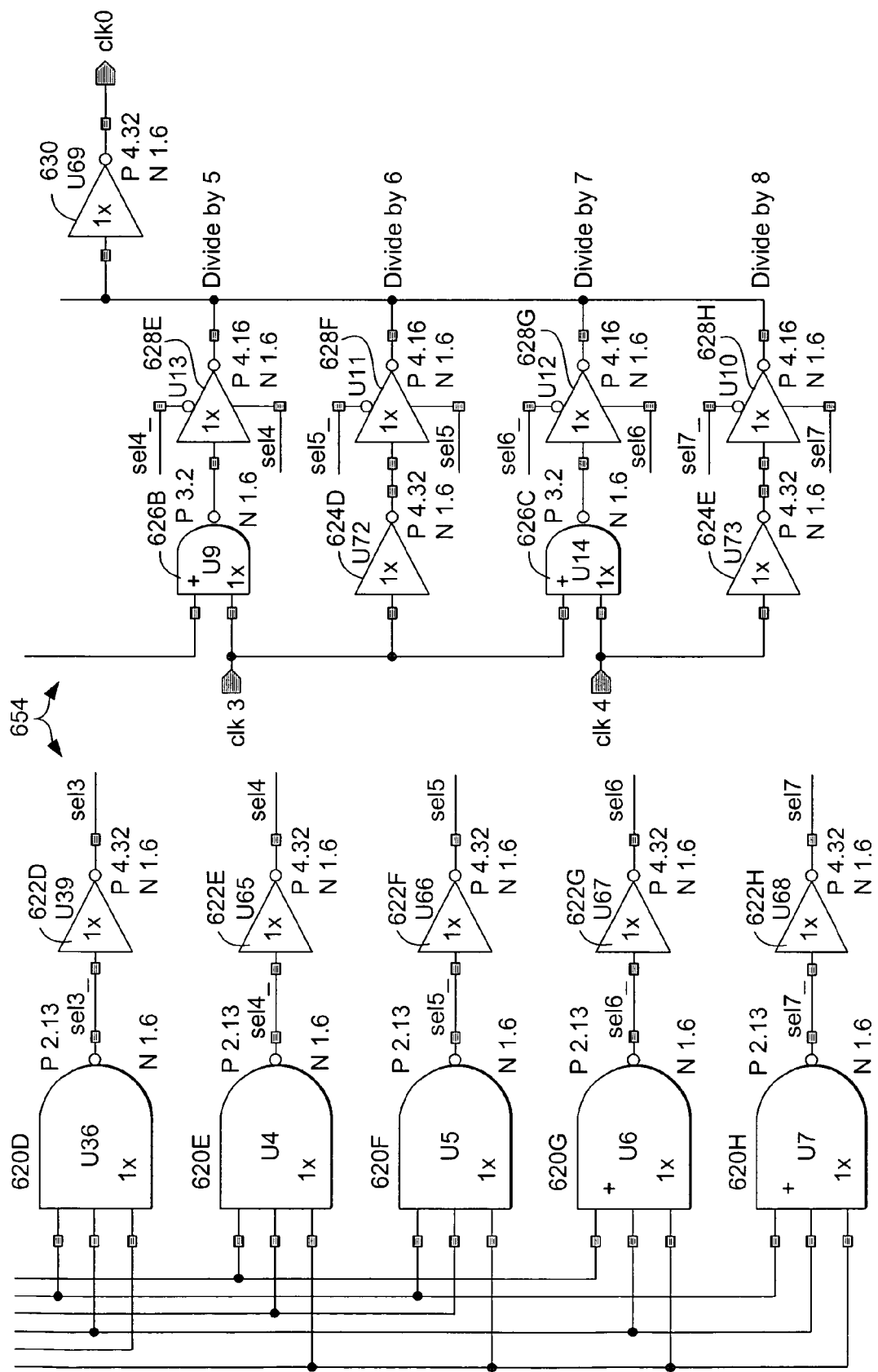
FIG. 6B1

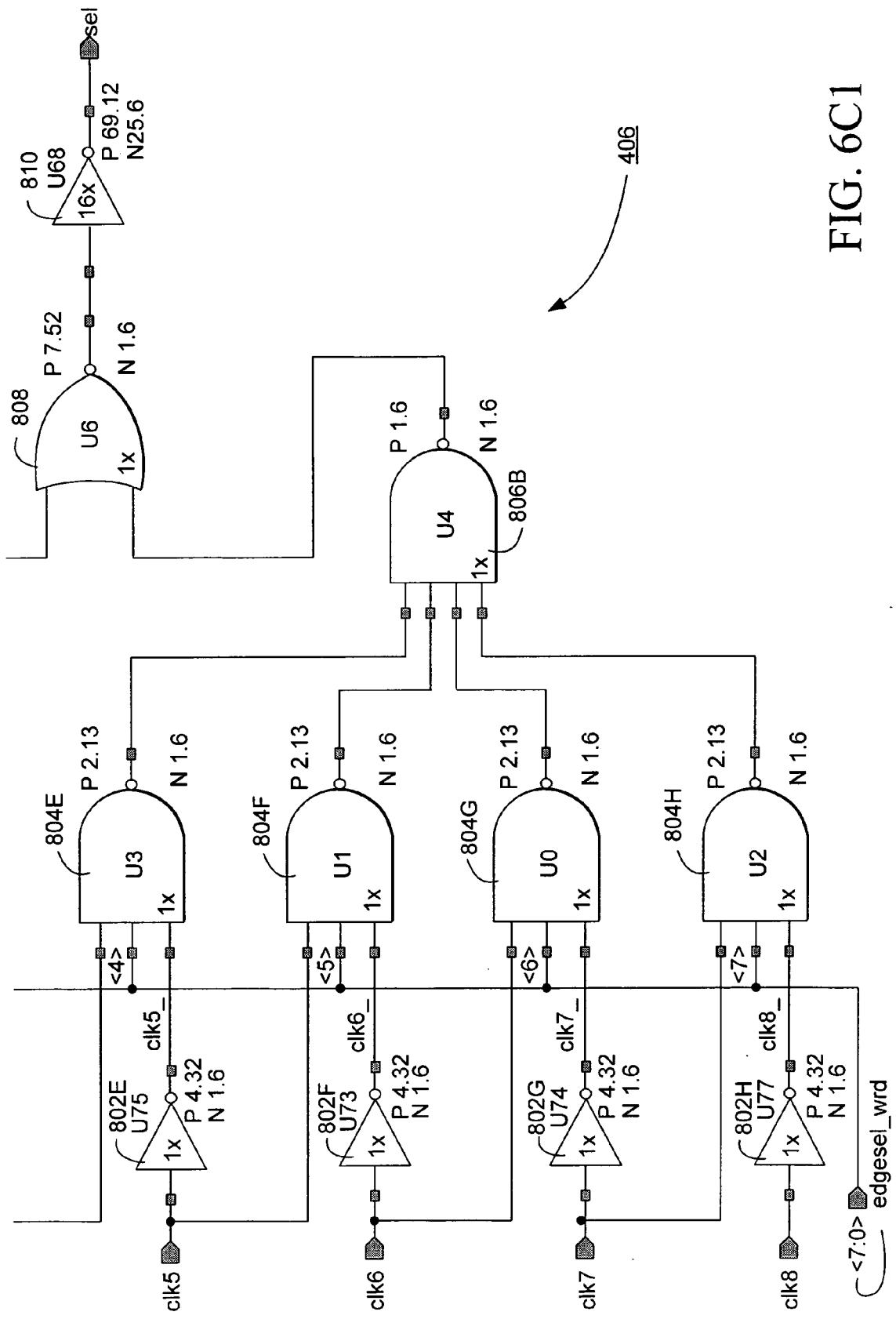
FIG. 6C1

|       | Pclk  |       |       |       |       |       |       |      |
|-------|-------|-------|-------|-------|-------|-------|-------|------|
| 400   | 1     | 2     | 3     | 4     | 5     | 6     | 7     | 8    |
| 1     | 400.0 |       |       |       |       |       |       |      |
| 2     | 200.0 | 400.0 |       |       |       |       | 1000  |      |
| 3     | 133.3 | 255.7 | 400.0 |       |       |       |       |      |
| 4     | 100.0 | 200.0 | 300.0 | 400.0 |       |       |       |      |
| 5     | 80.0  | 160.0 | 240.0 | 320.0 | 400.0 |       |       |      |
| 6     | 66.7  | 133.3 | 200.0 | 266.7 | 333.3 | 400.0 |       |      |
| 7     | 57.1  | 114.3 | 171.4 | 228.6 | 285.7 | 342.9 | 400.0 |      |
| 8     | 50.0  | 100.0 | 150.0 | 200.0 | 250.0 | 300.0 | 350.0 | 400.0 |

| 533 | 1     | 2     | 3     | 4     | 5     | 6     | 7    | 8    |
|-----|-------|-------|-------|-------|-------|-------|------|------|
| 1   | 533.0 |       |       |       |       |       |      |      |
| 2   | 256.5 | 533.0 |       |       |       |       | 1001 |      |
| 3   | 177.7 | 355.3 | 533.0 |       |       |       |      |      |
| 4   | 133.3 | 265.5 | 399.3 | 533.0 |       |       |      |      |
| 5   | 106.6 | 213.2 | 319.8 | 426.4 | 533.0 |       |      |      |
| 6   | 88.8  | 177.7 | 266.5 | 355.3 | 444.2 | 533.0 |      |      |
| 7   | 76.1  | 152.3 | 228.4 | 304.6 | 380.7 | 456.9 | 533.0 |     |
| 8   | 66.5  | 133.3 | 199.5 | 266.5 | 333.1 | 399.8 | 466.4 | 533.0 |

| 600 | 1     | 2     | 3     | 4     | 5     | 6     | 7    | 8    |
|-----|-------|-------|-------|-------|-------|-------|------|------|
| 1   | 500.0 |       |       |       |       |       |      |      |
| 2   | 300.0 | 500.0 |       |       |       |       | 1002 |      |
| 3   | 200.0 | 400.0 | 600.0 |       |       |       |      |      |
| 4   | 150.0 | 300.0 | 450.0 | 600.0 |       |       |      |      |
| 5   | 120.0 | 240.0 | 360.0 | 480.0 | 600.0 |       |      |      |
| 6   | 100.0 | 200.0 | 300.0 | 400.0 | 500.0 | 600.0 |      |      |
| 7   | 85.7  | 171.4 | 257.1 | 342.9 | 428.6 | 514.3 | 600.0 |     |
| 8   | 75.0  | 150.0 | 225.0 | 300.0 | 375.0 | 450.0 | 525.0 | 600.0 |

| 677 | 1     | 2     | 3     | 4     | 5     | 6     | 7    | 8    |
|-----|-------|-------|-------|-------|-------|-------|------|------|
| 1   | 677.0 |       |       |       |       |       |      |      |
| 2   | 638.5 | 677.0 |       |       |       |       | 1003 |      |
| 3   | 225.7 | 451.5 | 677.0 |       |       |       |      |      |
| 4   | 169.3 | 338.5 | 507.8 | 677.0 |       |       |      |      |
| 5   | 125.4 | 270.6 | 406.2 | 511.6 | 677.0 |       |      |      |
| 6   | 113.8 | 225.7 | 338.5 | 451.3 | 564.2 | 677.0 |      |      |
| 7   | 86.7  | 193.1 | 290.1 | 386.3 | 483.6 | 580.3 | 677.0 |     |
| 8   | 84.6  | 169.3 | 253.9 | 338.5 | 423.1 | 507.8 | 592.4 | 677.0 |

| 800 | 1     | 2     | 3     | 4     | 5     | 6     | 7    | 8    |
|-----|-------|-------|-------|-------|-------|-------|------|------|
| 1   | 800.0 |       |       |       |       |       |      |      |
| 2   | 400.0 | 800.0 |       |       |       |       | 1004 |      |
| 3   | 266.7 | 533.3 | 800.0 |       |       |       |      |      |
| 4   | 200.0 | 400.0 | 600.0 | 800.0 |       |       |      |      |
| 5   | 160.0 | 320.0 | 480.0 | 640.0 | 800.0 |       |      |      |
| 6   | 133.3 | 266.7 | 400.0 | 533.3 | 666.7 | 800.0 |      |      |
| 7   | 114.3 | 228.5 | 342.9 | 457.1 | 571.4 | 685.7 | 800.0 |     |
| 8   | 100.0 | 200.0 | 300.0 | 400.0 | 500.0 | 600.0 | 700.0 | 800.0 |

FIG. 9

METHOD AND APPARATUS FOR PROGRAMMABLE SAMPLING CLOCK EDGE SELECTION

FIELD OF THE INVENTION

The present invention relates to synchronizing data transfers between clock domains that have different clock frequencies.

BACKGROUND

In most complex electronic systems, data is transferred between clock domains that operate at various clock frequencies. When data is transferred across a clock boundary from a clock domain with one clock frequency to a clock domain with a different clock frequency, some synchronization mechanism is typically employed. The synchronization mechanism assures, for example, that circuitry in the receiving clock domain samples transmitted data when it is valid. The synchronization mechanism accounts for differences in clock frequency, and possibly delays caused by physical path characteristics, to assure proper setup and hold times for digital data signals.

FIG. 1 is a block diagram showing portions of a prior art system 100. The system 100 includes a system input/output ("I/O") component 102, a clock source 104, and a dependent clock generator 106. The system I/O component 102 encompasses two clock domains, clock domain A and clock domain B separated by a clock domain boundary 108. The system component 102 is an example of a component that receives and transmits data across one or more clock domain boundaries. For example, the system component 102 may be a semiconductor chip or "chipset" that performs multiple data I/O functions, such as a memory controller function and a memory interface function. As an example, part of the functionality of the clock domain A is a memory controller 110, and part of the functionality of the clock domain B is a memory interface 112. Many memory components operate at high speeds relative to other system components. Most system components communicate with memory components. Therefore, the memory controller 110 of clock domain A receives data from and transmits data to memory components for a variety of system components, such as front-side buses, processors, graphics controllers, etc. The memory controller 110 includes gear ratio logic 114 and data and control logic 116. The memory controller components operate at the rate of a PCLK clock signal, which is supplied by the clock source 104.

The memory interface 112 includes a divide-by-X circuit 118 and data and control logic 120. The components of the memory interface 112 operate at the rate of a CLKIN clock signal. CLKIN is faster than PCLK and is generated by the dependent clock generator 106. Typically, the rate of CLKIN is a multiple of the rate of PCLK. In one direction of transmission, the data bits D0-D3 on the data lines 122 are received by the data and control logic 116 and placed on the parallel data lines D0-D3 each cycle of PCLK. Data and control logic 120 is capable of receiving the four bits of data in parallel and placing them on the serial data line 124 each cycle of CLKIN. The data and control logic 120 must sample the data on the data lines D0-D3 at the appropriate times in order to assure that the data is valid and to maximize throughput. In order to assure accurate data transmission and sampling across the timing boundary 108, the two clocks operating data and control logic 116 and data and control logic 120 must be kept in phase alignment. In addition, because there may be multiple edges of the faster clock available for sampling data in a given cycle of the slower clock, there must be a mechanism for determining which edges of the faster clock to use for sampling data.

The gear ratio logic 114 is used to generate two signals, PCLK/M and SCLK/N, each having a common frequency for phase alignment. The values of M and N are chosen based on the frequencies of PCLK and SCLK so that the resulting PCLK/M and SCLK/N have a common frequency. SCLK/N and PCLK/M are transmitted to phase detector and phase alignment circuitry in the dependent clock generator 106. In this way, the clocks from each of the clock domains A and B can be phase aligned so that data is sampled accurately across the timing boundary 108. The phase alignment process of system 100, as explained above, has disadvantages. For example, M/N is usually not the true ratio relationship between PCLK and CLKIN because, in the system of FIG. 1, CLKIN is first divided by X in the fixed divide-by-X circuit 118. This limits the flexibility of the system with respect to the range of PCLK and CLKIN frequencies that can be effectively supported. System 100 also has disadvantages associated with its method for determining data sampling edges, as explained further below.

The gear ratio logic 114 also generates edge information that is used by data and control logic 116 to generate a control signal 126 that dictates which CLKIN edges are used by data and control logic 120 to sample data. Because CLKIN is faster than PCLK (usually CLKIN is approximately a multiple of PLCK) multiple CLKIN edges are available to sample data in a given PLCK cycle. One method for determining sampling edges is to assign color values to cycles in a clock period that is common to CLKIN and PCLK. Assuming phase alignment of PCLK and CLKIN signals and a defined reference starting point, the color values identify CLKIN edges upon which data transfers should take place. One disadvantage of this method is that the control signal 126 specifying sampling edges is generated and loaded every common clock cycle. Generating and loading the control signal anew each common clock cycle is a timing challenge. In addition, this method adds significant complexity to the verification and testing process. For example, test vectors must be written for all possible cases, and logic must be added to generate the vectors and the control signals.

There is therefore a need for a method and apparatus for synchronizing data transfer across a clock domain boundary with greater flexibility in the choice of clock frequencies. There is a further need for such a method and apparatus that is less expensive to implement, is more reliable, and is easier to test and verify.

BRIEF DESCRIPTION OF THE DRAWINGS

The present invention is illustrated by way of example, and not by way of limitation, in the figures of the accompanying drawings in which:

FIG. 9 is a series of tables that illustrate the design flexibility provided by the described embodiments.

DETAILED DESCRIPTION

A method and apparatus for transferring data across a clock domain boundary is described. In one embodiment, a fixed relationship between a faster clock ("CLKIN") and a slower clock ("PLCK") is maintained in the process of phase alignment to allow great flexibility in allowable combinations of CLKIN and PLCK frequencies. In one embodiment, an encoded edge select word is generated once at system initialization and used thereafter to select edges of CLKIN on which to sample data. The value of the encoded edge select word is based, in part, on the fixed relationship between CLKIN and PCLK. Embodiments of the invention allow greater design flexibility as well as simpler logic design than prior systems.

Figure 1:
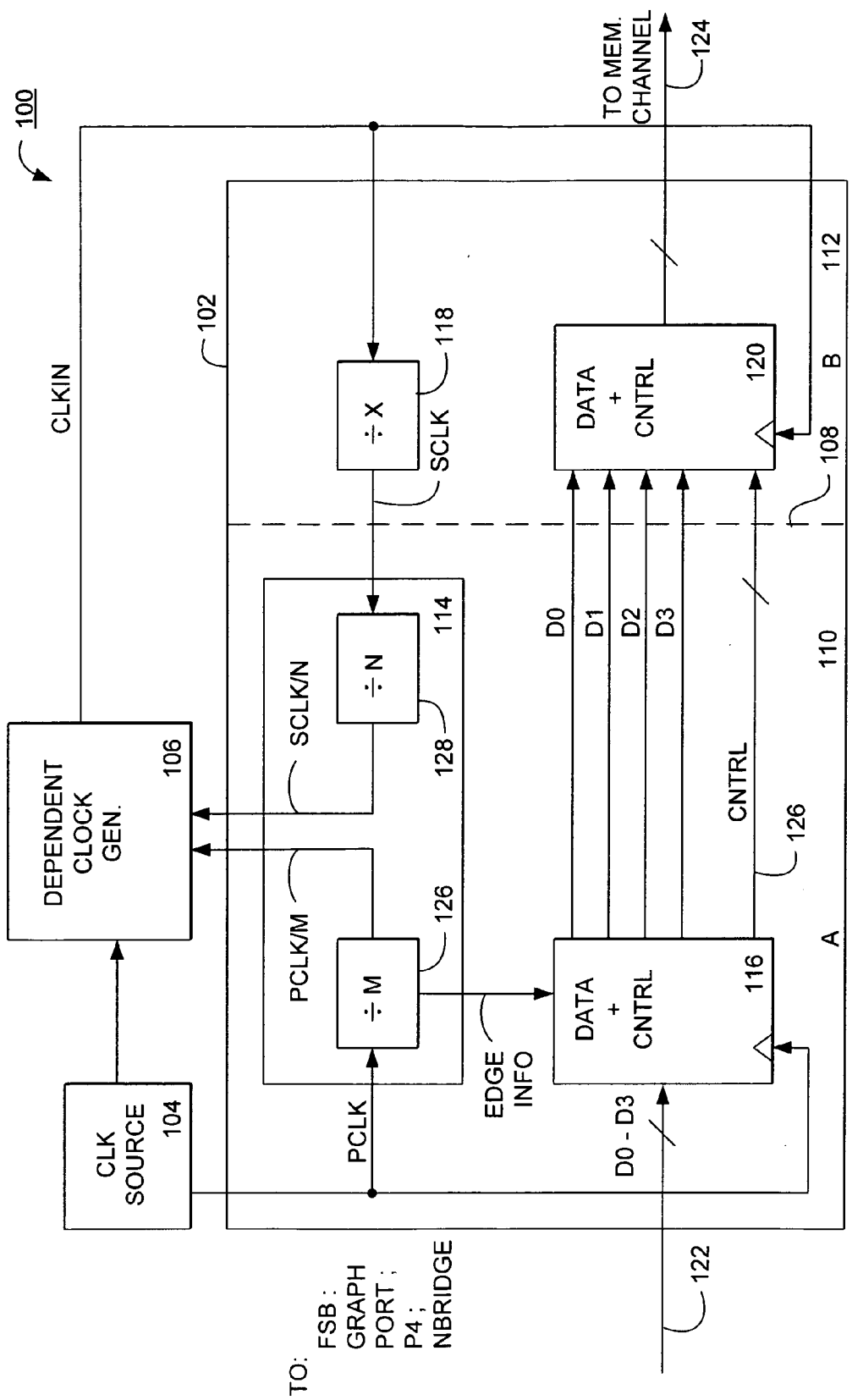
FIG. 1 is a block diagram of a prior art system in which data is transferred across a clock domain boundary between clock domains that have different clock frequencies.
Figure 2:
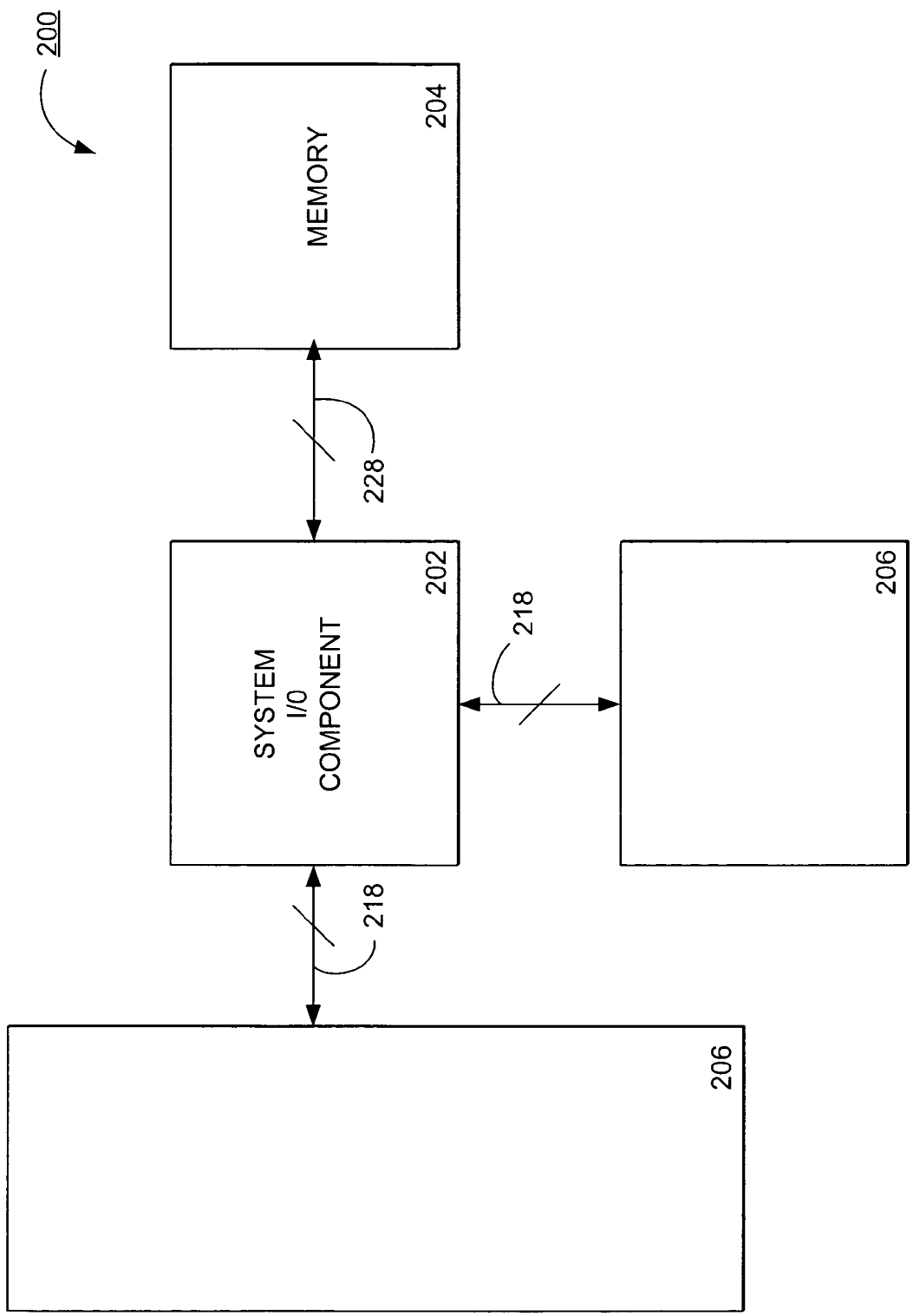
FIG. 2 is a block diagram of an embodiment of a system in which data is transferred across one or more clock domain boundaries.

FIG. 2 is a block diagram of a system 200 according to one embodiment. The system 200 includes a system I/O component 202 and a memory component 204. The system, I/O component 202 communicates with the memory component 204 through lines or buses 228. Lines or buses 228, in one embodiment, are physical signal carriers that carry information signals such as data or control signals. In one embodiment, the memory component 204 is a large capacity, high speed memory such as a dynamic random access memory ("DRAM"). The memory component 204 may be single or multiple integrated circuits. The memory component 204 is accessed by various other components 206 in the system 200. These components include, for example, a central processing unit, an arbitration unit, a graphics component, and a direct memory access component. The components 206 each request access to the memory component 204 for storage and retrieval of data through one or more lines or buses 218. Lines or buses 218, in one embodiment, are physical signal carriers that carry information signals such as data or control signals. Each of the components 206 may operate at different frequencies, which are each typically lower than the operating frequency of the memory component 204. Data and control information is transferred between the memory component 204 and the various requesters 206 through the system I/O component 202. The system I/O component 202, among other functions, handles the differences in operating clock frequencies between the requesters 206 and the memory component 204.

Figure 3:
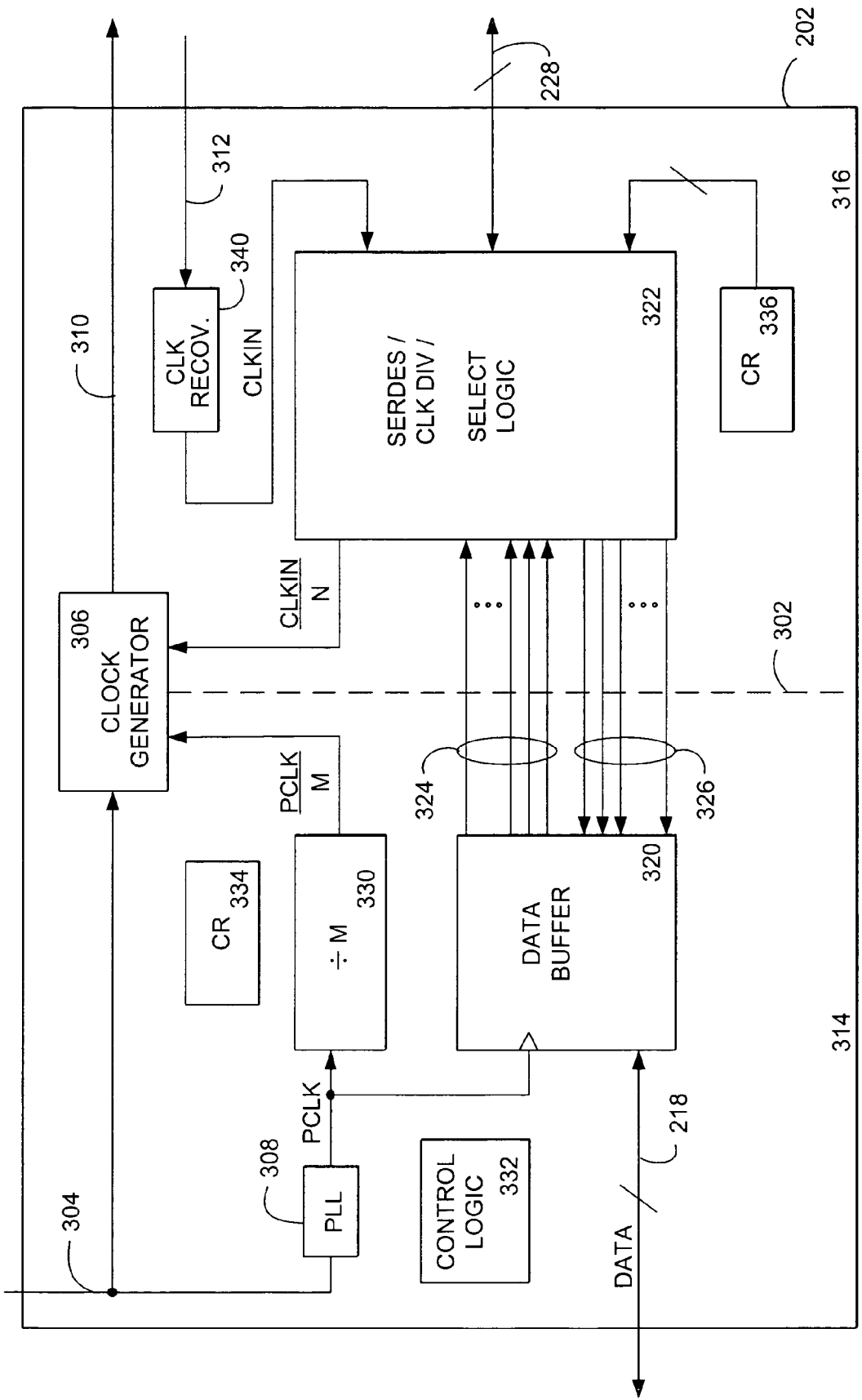
FIG. 3 is a block diagram of an embodiment of a system input/output ("I/O") component.

FIG. 3 is a block diagram of the system I/O component 202, including circuit elements on both sides of a clock domain boundary 302. In one embodiment, the left clock domain is a slower clock domain and the right clock domain is a faster clock domain. In one embodiment, the components on the left are parts of a memory controller 314, and the components on the right are parts of a memory interface 316. The memory interface 316 provides an interface between high speed memory components (not shown) and any other system components that request access to memory components. In other embodiments, the components on the right and left sides of the clock domain boundary 302 could have any of several functions that require the transfer of data across a clock domain boundary. In some embodiments, the I/O component 202 includes the elements and functionality described, as well as additional elements with additional functions.

The system I/O component 202 receives a source clock signal 304 that is distributed to a clock generator 306 and to a phase locked loop ("PLL") 308. The PLL 308 generates a PCLK signal that is distributed to components on the left side of the clock domain boundary 302. The clock generator 306 generates a clock signal 310 that is faster than the source clock signal 304. The clock signal 310 is received by clock circuitry (not shown). The clock circuitry (not shown) processes and distributes the clock signal 310 as necessary using known circuits and methods. A clock signal 312 is returned from the clock circuitry (not shown) to a clock recovery circuit 340. The clock recovery circuit 340 generates a CLKIN signal that is distributed to components on the right side of the clock domain boundary 302.

The memory controller 314 receives data from and transfers data to components requesting memory access on data lines 218. The data buffer 320 transfers data to and receives data from a serializer-deserializer/clock divider/select logic ("SDCDS") circuit 322 across the clock domain boundary 302. The SDCDS circuit 322 performs multiple functions as will be described. However, these multiple functions, as well as various functions of other circuit elements described, could be performed by individual circuit elements in any combinations. Individual circuit elements may be on different integrated circuits or on one integrated circuit. The arrangement of elements and functions shown is but one embodiment.

In one embodiment, the data on data lines 218 is received in serial by the data buffer 320 and transmitted in parallel to the SDCDS 322 on parallel data lines 324. The SDCDS 322 transmits data to and receives data from memory elements (not shown) on serial data lines 228 at the rate of CLKIN. Data from the SDCDS is transmitted in parallel to the data buffer 320 on parallel data lines 326. The SDCDS 322 operates at the frequency of CLKIN, which is greater then the frequency of PCLK. For purposes of illustration, a CLKIN frequency of 400 MHz will be used and a PCLK frequency of 160 MHz will be used.

In order to phase align CLKIN and PCLK, each of the clock signals is divided as necessary to produce two clock signals with the same frequency. PCLK is divided by divide-by-M circuit 330 to produce a PCLK/M signal. CLKIN is divided by a divide-by-N circuit that is part of the SDCDS 322 to produce a CLKIN/N signal. The divide-by-N circuit will be described in more detail below. In one embodiment, M and N are each positive whole numbers. The PCLK/M signal and the CLKIN/N signal have the same frequency. In our example, PCLK has a frequency of 160 MHz and CLKIN has a frequency of 400 MHz. When PCLK is divided by two and CLKIN is divided by five, PCLK/M and CLKIN/N each have a frequency of 80 MHz. PCLK/M and CLKIN/N are received by the clock generator 306, which includes phase detection and phase alignment circuitry (not shown). The phases of PCLK/M and CLKIN/N are aligned using known methods.

The data buffer 320 and the SDCDS 322 each receive control signals that determine when and how each element processes data. For example, because the data buffer 320 receives data at 160 MHz and the SDCDS 322 can receive and transmit data at 400 MHz, data must be staged and aligned properly for transfer. In addition, because there are multiple CLKIN edges available for data transfer in one PCLK cycle, particular sampling edges must be chosen to assure that valid PCLK data is sampled. The memory controller 314 includes control logic 332, which includes logic that determines when and how to stage and sample data based on the frequencies of PCLK and CLKIN, as well as other factors such as the depths of data buffer 320 and SDCDS 322. The memory controller 320 generates control words that are stored in control register 334 and control register 336. Control words in the control register 334 control elements of the memory controller 314, and control words in the control register 336 control elements of the memory interface 316.

Figure 4:
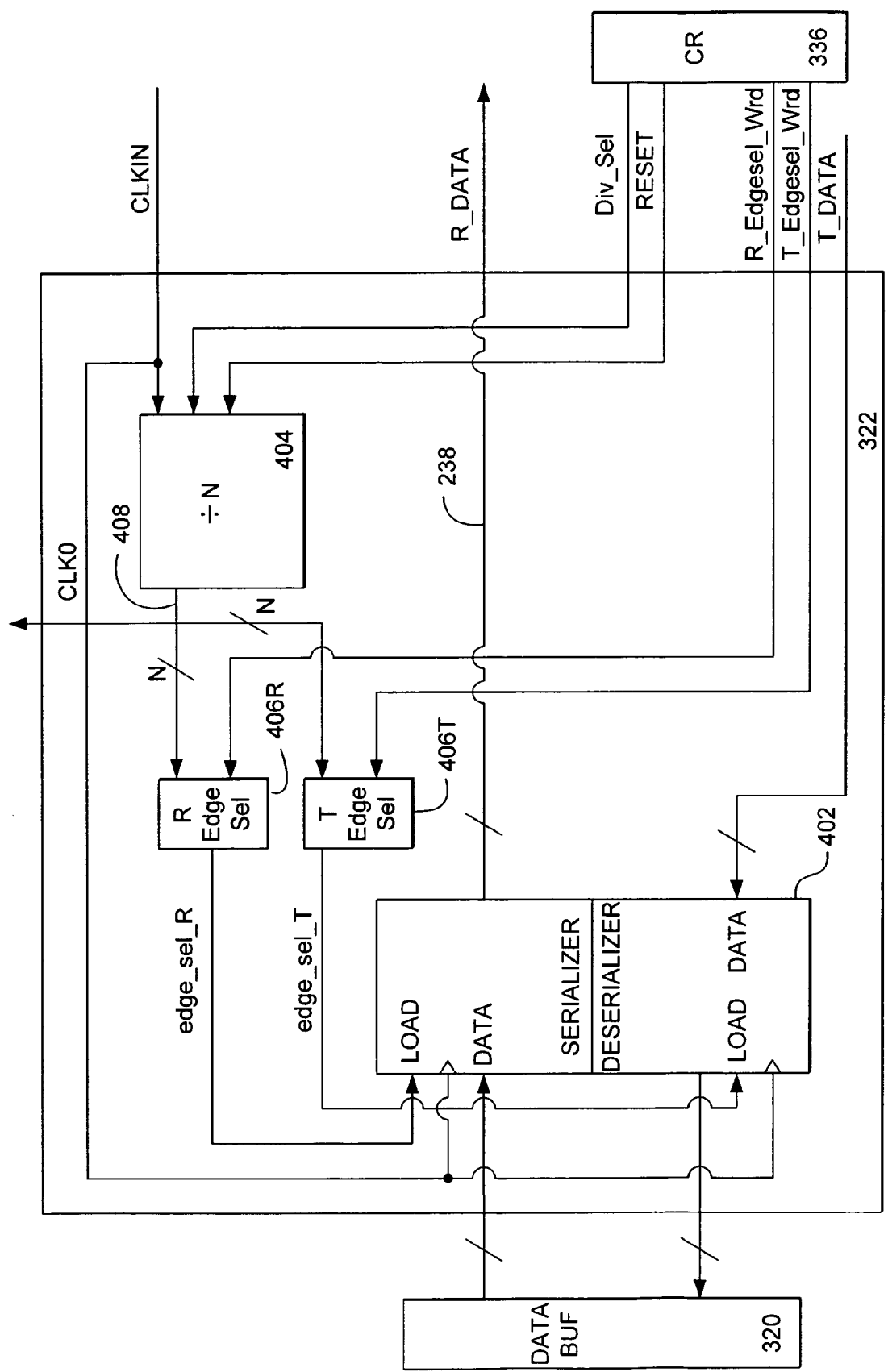
FIG. 4 is a block diagram of elements of a serializer-deserializer/clock divider/select logic circuit.

FIG. 4 is a block diagram of elements of the SDCDS 322. FIG. 4 includes a serializer-deserializer ("SERDES") 402, a divide-by-N circuit 404, and edge select pulse generators 406R and 406T. The SERDES 402 receives serial data from the data buffer 320 and loads it according to the CLKIN signal and a receive edge select pulse, edge_sel_R, generated by the edge select pulse generator 406R. The serialized data, R_Data, is transferred to memory elements (not shown). The SERDES 402 receives parallel data, T_Data, from memory elements (not shown) and loads it according to the CLKIN signal and a transmit pulse, edge_sel_T, generated by the edge select pulse generator 406T. The deserialized data is transferred to the data buffer 320. The divide-by-N circuit 404 receives the CLKIN signal, a div_sel signal that determines the value of N, and a reset signal, and generates a clk0 signal and N clock signals 408, clk1-clkN, that are progressively delayed. Each of the N clock signals has the same frequency. Clk0 is CLKIN/N of FIG. 3. The divide-by-N circuit 404 will be described in further detail below.

The edge select pulse generator 406R receives the N clock signals and an edge select word (R_edgesel_wrd) from the control register 336 and generates a pulse that enables the load function of the serializer. The edge select pulse generator 406T receives the N clock signals and an edge select word (T_edgesel_wrd) from the control register 336 and generates an edge select pulse that enables the load function of the deserializer. The edge select pulse generators 406 will be described in more detail below.

Figure 5:
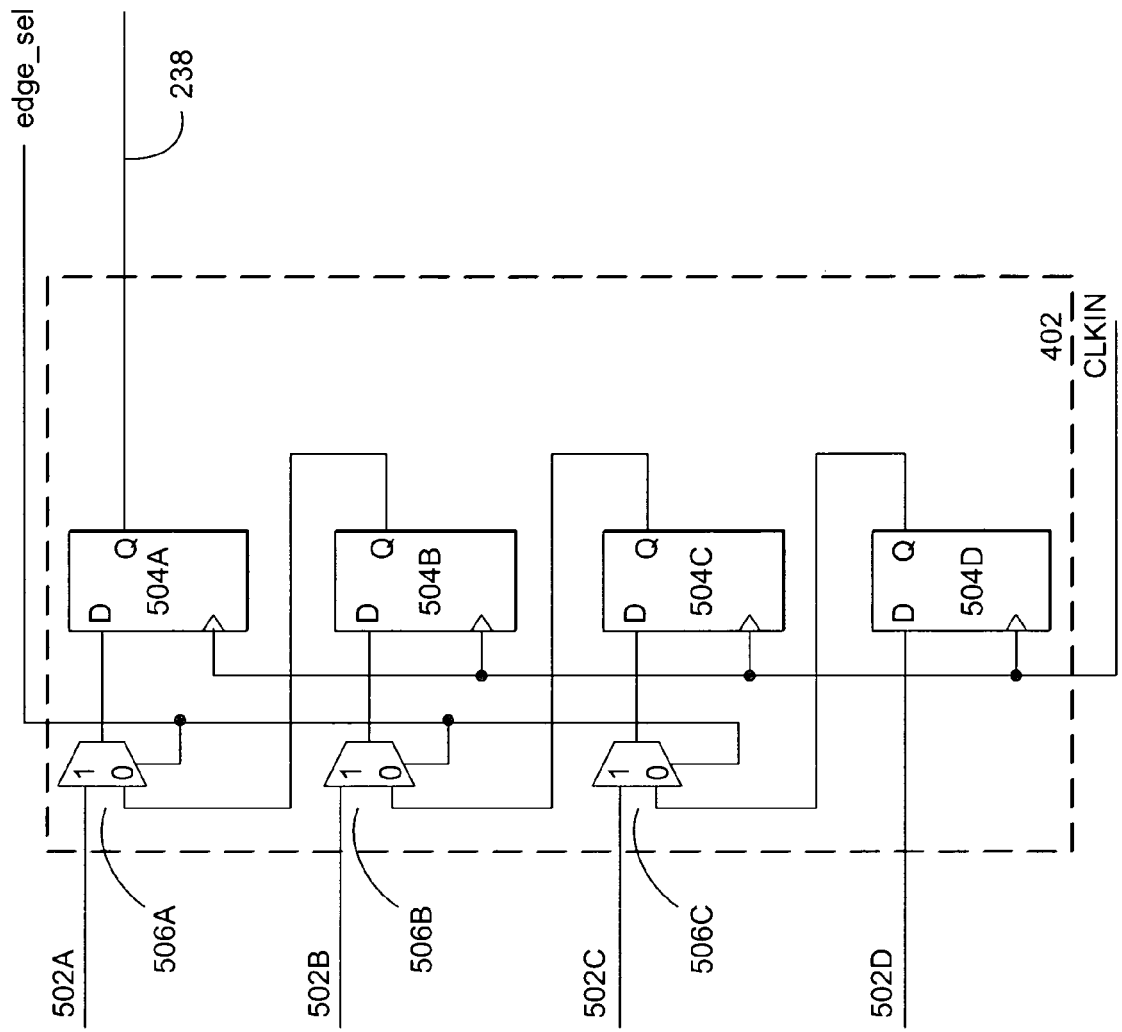
FIG. 5 is a block diagram that illustrates the function of one embodiment of a serializer-deserializer.

FIG. 5 is a block diagram that illustrates the function of one embodiment of the SERDES 402. Data lines 502A-502D come from the data buffer 320 (not shown). In FIG. 5, four bits of data are shown as an example. The actual size of the data buffer 320 and the SERDES 402 can vary, but is typically larger. For example, in one embodiment, the actual number of data bits stored by the data buffer 320 is eight. The implementation is not dependent on the number of data bits stored by the data buffer 320 or received by the SERDES 402. In one embodiment, SERDES 402 includes four flip-flops 504A-504D and three multiplexors 506A-506C. Data on the data lines 502 is received on one data input of each of the multiplexors 506. The other data input of each of the multiplexors 506 is connected to a data output of an adjacent lower flip-flip 504. When the edge_sel_R pulse is active the data from the data lines 502 is passed to the data input of the respective flip-flips 504. When the edge_sel_R pulse is not active, the data from the output of the adjacent lower flip-flip is passed to the data input of the respective flip-flop 504. Data is passed from the input of the flip-flop 504A to the data line 228 on the active edges of the CLKIN signal.

Figure 6:
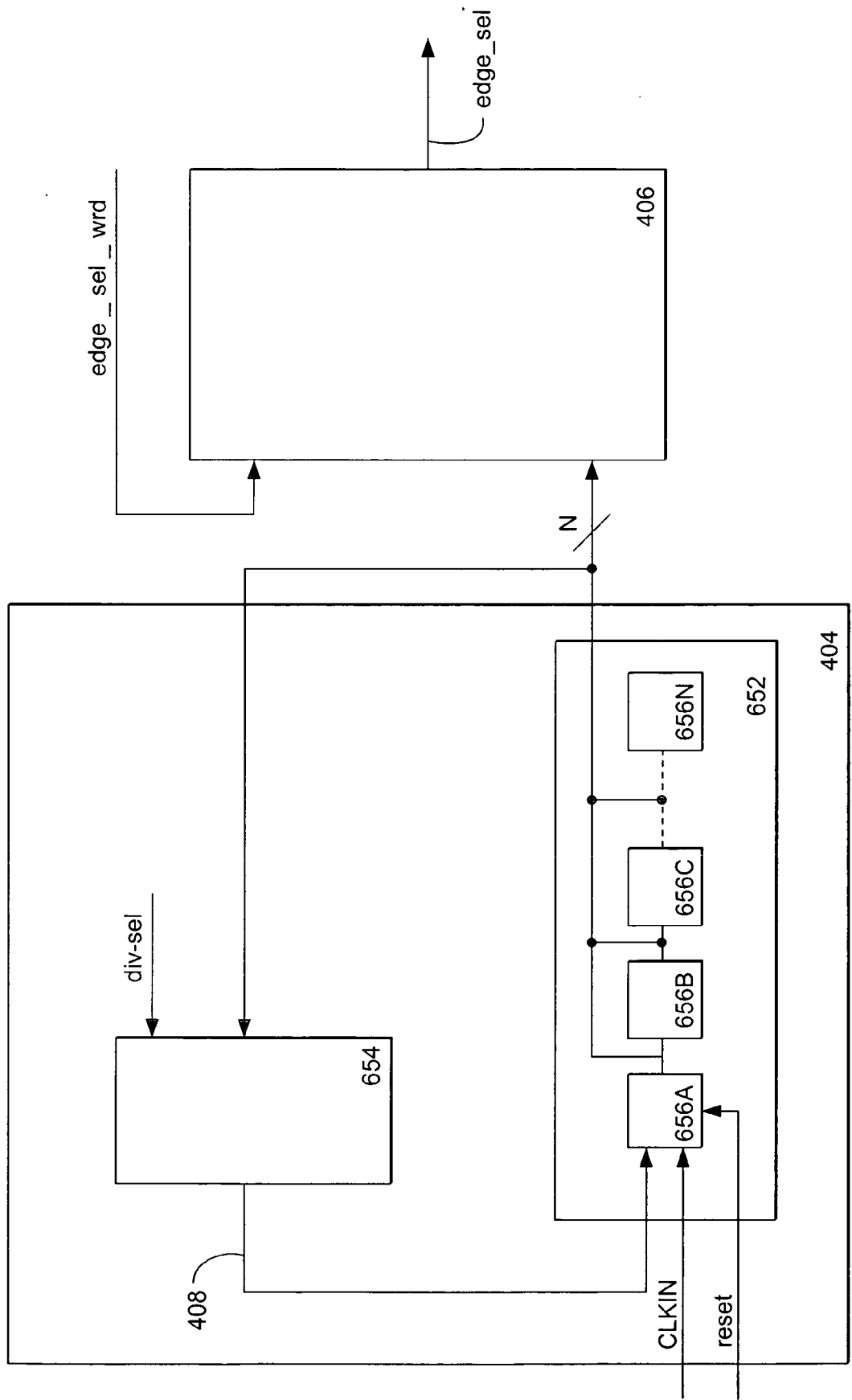
FIG. 6 is a diagram of an embodiment of a divide-by-N circuit with an embodiment of an edge select pulse generator.

FIG. 6 is a block diagram of embodiments of a divide-by-N circuit 404 and an edge select pulse generator 406. The divide-by-N circuit 404 creates a root divided clock, and the edge select pulse generator 406 provides a pulse that selects any combination of the clock edges created by the divided clock signal. The divide-by-N circuit 404 includes a programmable clock divider 654 and a delay circuit 652. The programmable clock divider 654 receives the div_sel signal as well as progressively delayed clock signals fed back from the delay circuit 652. The programmable clock divider 654 generates the divided clock signals 408, which are fed to the delay circuit 652. The delay circuit 652 includes a series of flip-flips 656 the each output a divided clock signal with a different phase. The phased divided clock signals are fed back to the programmable clock divider 654 and are also fed to the edge select pulse generator 406. Using the edge-sel_wrd signal, the edge select pulse generator generates the edge select pulse, edge_sel.

Figure 6A:
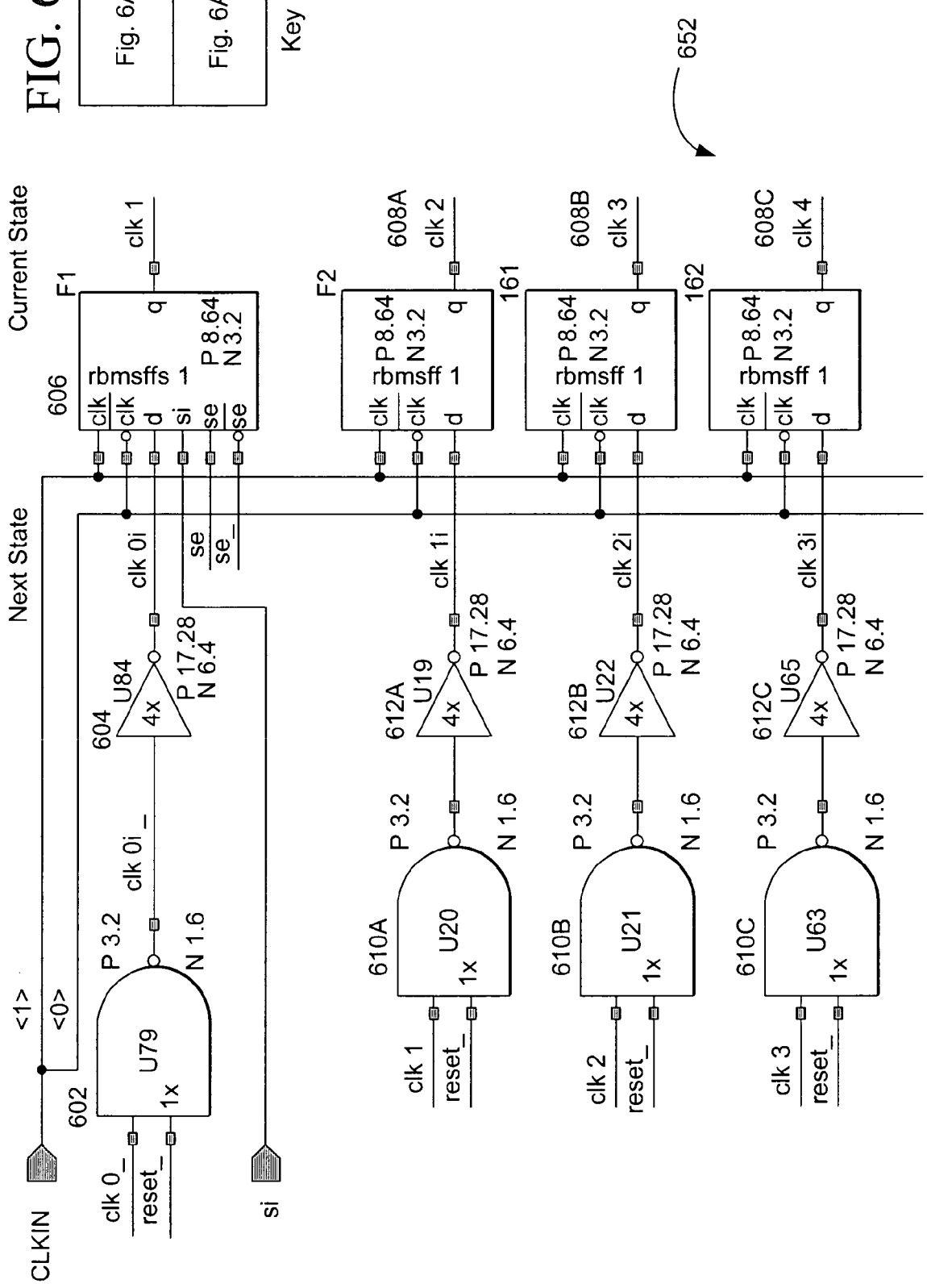
FIG. 6A is a diagram of a circuit element of the divide-by-N circuit of FIG. 6.
Figure 6B:
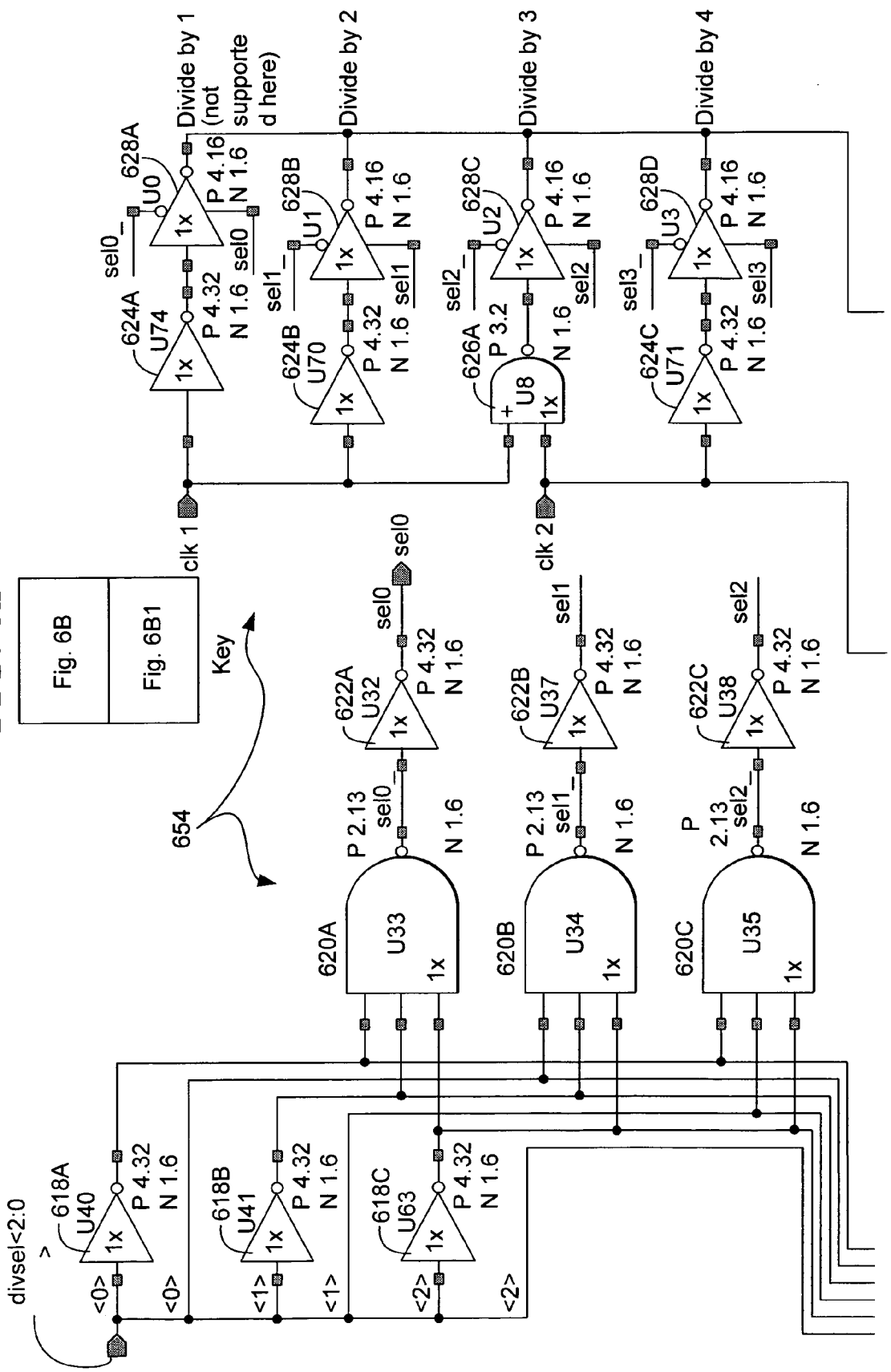
FIG. 6B is a diagram of another circuit element of the divide-by-N circuit of FIG. 6.

FIGS. 6A and 6B are diagrams of an embodiment of the divide-by-N circuit 404, including embodiments of the programmable clock divider 654 and the delay circuit 652. FIG. 6B is a block diagram of an embodiment of the edge select pulse generator 406. Referring to FIG. 6A, an embodiment of a delay circuit 652 is shown. The circuit 652 receives the clk0 signal and the reset signal. Clk0 is the root divided clock generated by the divide-by-N circuit 654. The generation of clk0 is shown in more detail in FIG. 6B. A flip-flop 606 receives clk0, inverted clk0 and signals "si", "se" and inverted "se" (these are scan in and scan enable signals that are generally used only for testing). Flip-flops 608A-G receive clk0, inverted clk0 and data inputs that are outputs of respective inverters 612. NAND gates 610A-H receive the outputs of specific flip-flops 608 and the reset signal, as shown. Inverters 612A-H invert the outputs of the NAND gates 610 before they are placed on respective flip-flop 608 data inputs. The last clock output of flip-flop 608G is used to generate a delayed "so" signal (a scan out signal, generally used only for testing) as shown. In this example, up to N=8 clock signals can be generated. Other numbers of clock signals are possible and are implemented in the same way.

Referring to FIG. 6B, a portion of the divide-by-N circuit 654 that generates divided clock signals is shown. Referring first to the left side of FIG. 6B, the subcircuit receives a three-bit div_sel word. In other embodiments, the length of the div_sel word can be greater or smaller. The three-bit div_sel word states what N is. For example, if N is three, div_sel is 011.

Inverters 618 make the three bits of the div_sel, as well as their inverses, available. Each of the three-input NAND gates 620 receives some combination of div_sel bits and their inverses. The outputs of the NAND gates 620 are inverted by inverters 622 to produce intermediate signals se10-se17. Referring to the right side of FIG. 6B, the clk outputs generated by the subcircuit of FIG. 6A (in FIG. 6B only clk0-clk4 are shown for clarity) are distributed among NAND gates 626A-C and inverters 624A-E as shown. The se10-se17 signals are received by tri-state devices 628A-628H, which also receive the outputs of the NAND gates 626A-C and the inverters 624A-E. The inverters 628A-H output divided clock signals, in this case a divide-by-2 signal through a divide-by-8 signal. A divide-by-1 signal is not supported in this embodiment, but could be supported in others. In other embodiments, a divide-by-1 signal is supported. In other embodiments, the number of divide-by-X clock signals generated is greater or less than seven. The signal clk0 output by the inverter 630 is an in-phase divided by N version of CLKIN that is transferred to the phase detection and phase alignment circuitry.

Figure 6C:
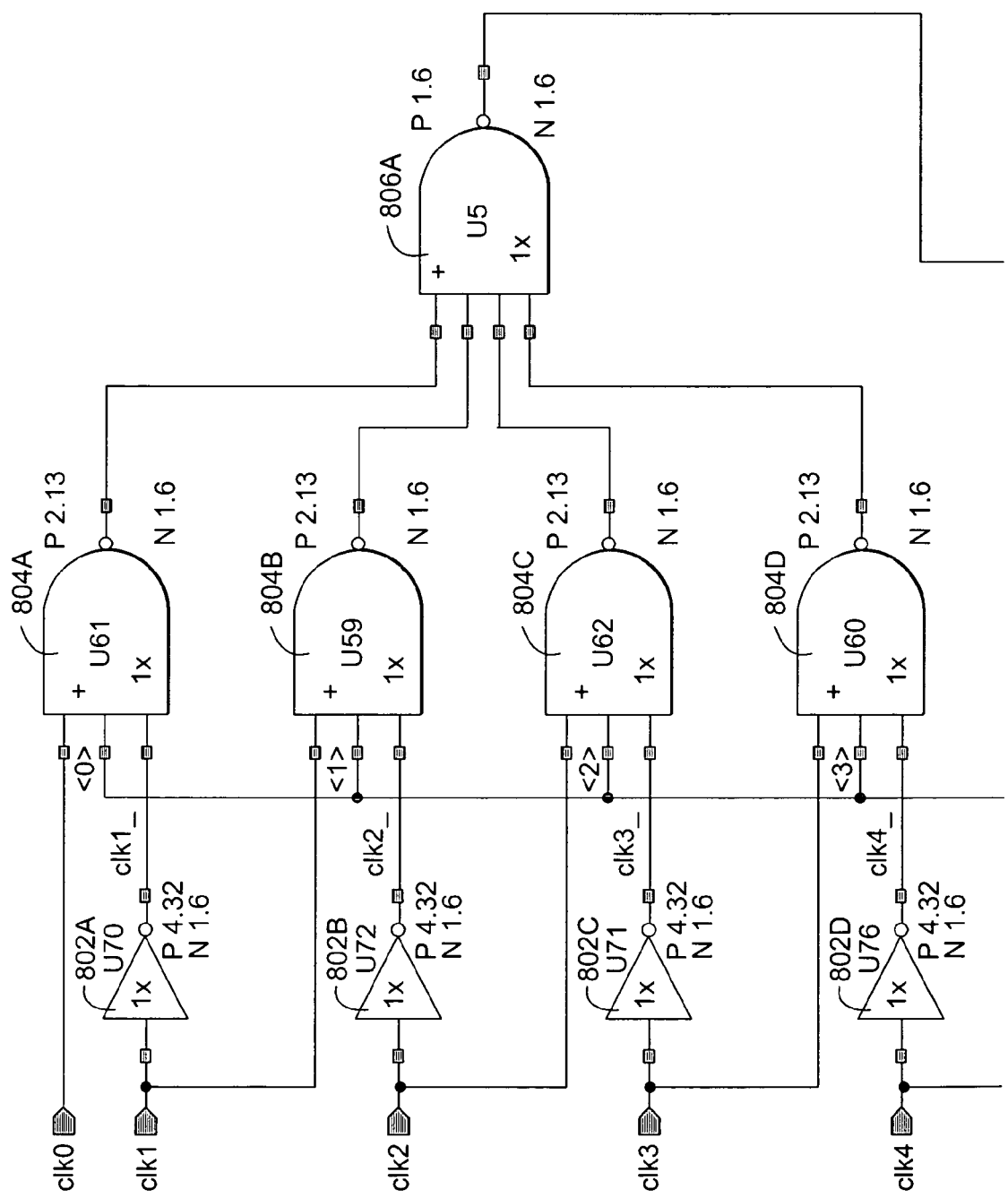
FIG. 6C is a diagram of the edge select pulse generator of FIG. 6.

FIG. 6C is a block diagram of an edge select pulse generator 406. The design of the edge select pulse generators 406R and 406T are the same in one embodiment, so only one pulse generator 406 is shown. The edge select pulse generator 406 receives the clk0 signal and the other divided clock signals generated by the divide-by-N circuit 404. In this example, clk1-clk8 are shown, but other numbers of clk signals are possible with the same implementation. The edge select pulse generator 406 also receives an edge select word ("edgesel_wrd"). In this embodiment, the edgesel_wrd is an eight-bit one-hot encoded word. Each of the eight bits represents an active edge of CLKIN on which sampling of data can occur. A "1" in a bit position indicates that sampling will occur on the corresponding CLKIN edge, and a "0" indicates that sampling will not occur on the corresponding CLKIN edge. In other embodiments, a "0" in a bit position indicates that sampling will occur on the corresponding CLKIN edge, and a "1" indicates that sampling will not occur on the corresponding CLKIN edge. In other embodiments, more or less bits could be included in the edgesel_wrd. The clk1-clk8 signals are inverted by inverters 802A-H. Three input NAND gates 804A-H each receive a divided clock signal input, clkX, an inverted divided clock signal input, clkX bar, and a bit of the edgesel_wrd, as shown. The outputs of the NAND gates 804A-H are combined in four input NAND gates 806A and 806B. The outputs of NAND gates 806A and 806B are NORed in NOR gate 808. The output of NOR gate 808 is inverted by inverter 810 to produce an edge select pulse.

The occurrence of appropriate sampling edges of the CLKIN signal forms a repeating pattern of varying length depending on the PCLK and CLKIN frequencies. The edgesel_wrd is generated at system initialization based on the PCLK and CLKIN frequencies and loaded into the control register 336. Thereafter, the edgesel_wrd is used to transfer data. No ongoing determinations of sampling edges need to be made, and no additional control words for dictating sampling edges need to be generated after system initialization.

Figure 7:
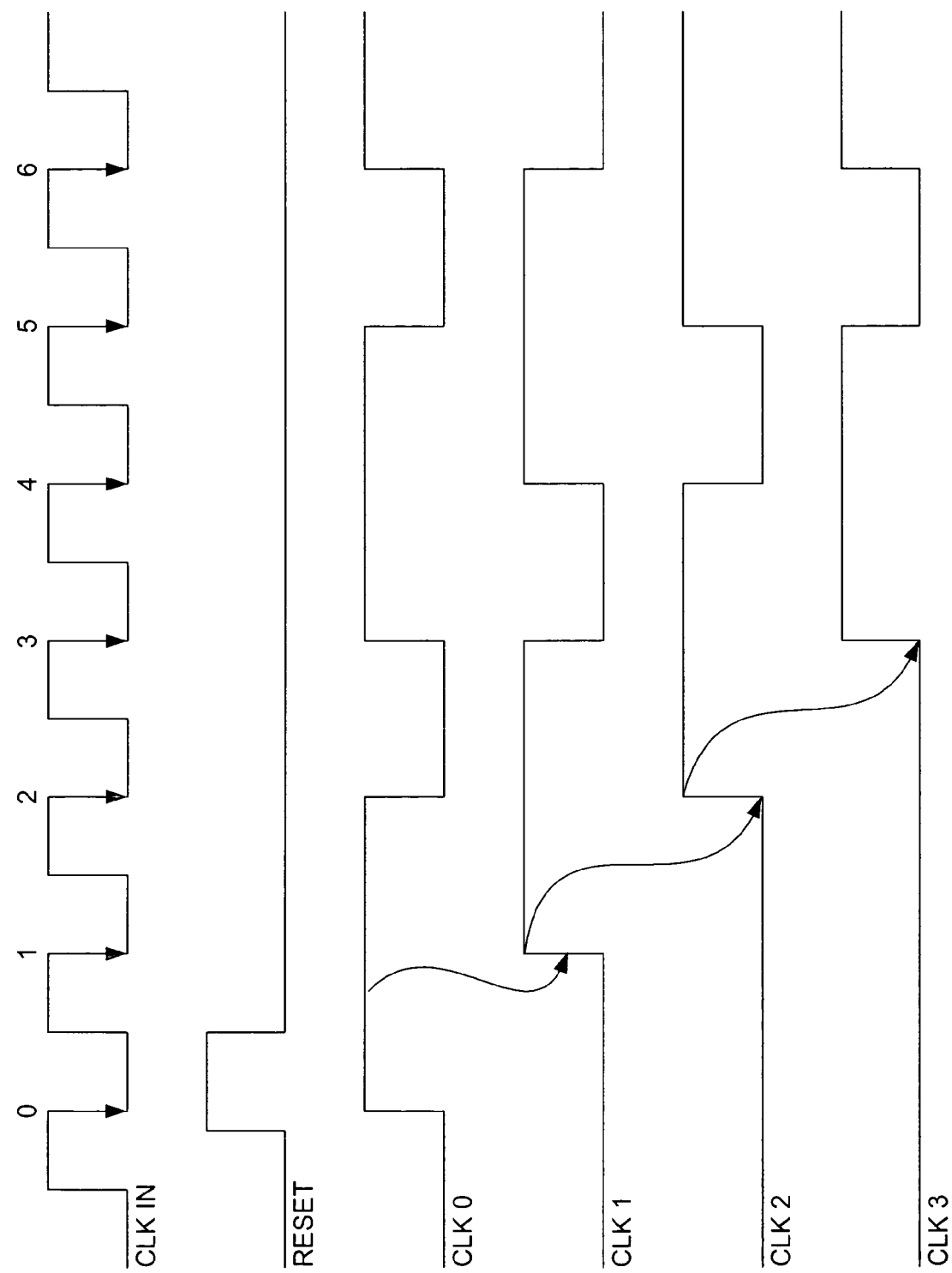
FIG. 7 is a waveform diagram that illustrates the generation of N clk signals by a divide-by-N circuit of one embodiment.

FIG. 7 is a waveform diagram that illustrates the generation of clk0-clk3 signals by the divide-by-N circuit 404. In this example, the div_sel value is three, therefore clk0 and three other clock signals are generated, each having a frequency divided by three with respect to the frequency of CLKIN, with successive clock signals having one CLKIN cycle delay between them. Because of the delay relationship, two adjacent clock signals can be used to create a single cycle pulse that is used as the edge select pulse. As will be further explained, the creation of pulses is one-hot encoded to yield any periodic pattern of edge select pulses. The gear ratio between the frequency of PCLK and CLKIN determines the number of pulses for a given divided period. For example, a ⅗ ratio causes CLKIN to be divided by five and causes three edge select pulses to be created. As another example, a ¼ ratio causes CLKIN to be divided by four and causes one edge select pulse to be created.

The CLKIN signal is shown with the reset signal. In response to an active pulse of the reset signal, all clocks are reset except clk0. The next cycle after the active pulse of the reset signal, clk1 is loaded from clk0. Clk2 is then loaded from clk1, and so on, until all of the N clock signals are established. Thus, a divided clock is created with a known relationship to the reset pulse. This allows the initial edge of the divided clock to be located, for example, for locating sampling edges.

Figure 8:
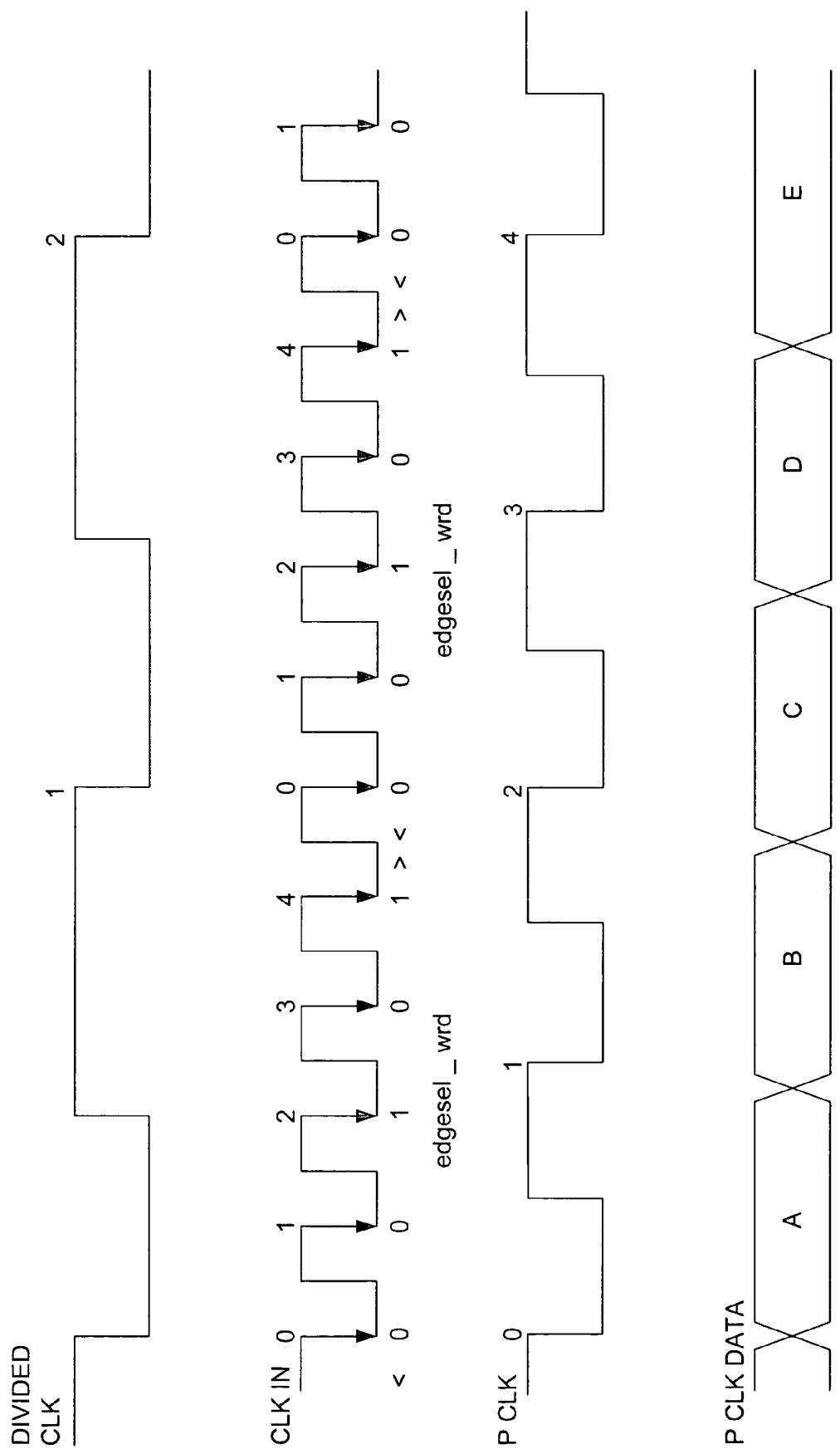
FIG. 8 is a waveform diagram that illustrates a particular case for the embodiments described.

FIG. 8 is a waveform diagram that illustrates a particular case for the embodiments described. In this example, the data buffer 302 (see FIG. 4) is four bits deep. In this example, the edgesel_wrd is five bits long. PCLK has a frequency of 160 MHz, CLKIN has a frequency of 400 MHz. PCLK/N=CLKIN/M=divided clock. In this case, divided clock has a frequency of 80 MHz. So, in this case, the gear ratio of PCLK to CLKIN is ⅖. M=2 and N=5. In various situations, more than one gear ratio may be available. In some embodiments, it is desirable to find the least common denominator of CLKIN and PCLK, for example to produce the highest possible divided clock frequency for phase detection and alignment. The divided clock has an uneven duty cycle, as shown. Two cycles of divided clock are labeled. One cycle of the divided clock, in this case, frames one pattern of sampling edges. One cycle of the divided clock can be referred to as a common clock cycle between PCLK and CLKIN. In one common clock cycle, two cycles of PCLK occur, and therefore two edges of CLKIN can be used to sample data. The sampling edges of CLKIN in one common clock cycle are edges 2 and 4. The corresponding edgesel_wrd is shown repeating for two common clock cycles. The edgesel_wrd is 00101. At the bottom of the diagram, valid data as clocked by PCLK is shown. It can be seen that sampling edge 2 and sampling edge 4 occur at different points in the PCLK cycle. In this case, the result is uneven transfer of data. Specifically, for the first common clock cycle, on CLKIN edge 2 data bits $A_0$ and $A_1$ are transferred. On CLKIN edge 4, data bits $B_0$, $B_1$ and $B_2$ are transferred. For the second common clock cycle, data bits $C_0$ and $C_1$ are transferred on the CLKIN edge 2, and so on.

The reset signal has a known relationship with the divided clock, as shown for example in FIG. 7. This guarantees a fixed relationship between CLKIN and PCLK such that when a particular edge of CLKIN is programmed to be a sampling edge, that edge has the same relationship to PCLK each time the system is initialized.

At initialization, the memory controller 314 (FIG. 3) determines how to stage data according to the active CLKIN edges used and the relative clock domain frequencies and programs the control logic 332 accordingly.

FIG. 9 is a series of tables that illustrates some of the wide range of clock frequencies supported and the design flexibility provided by the described embodiments. Tables 1000-1004 each list gear ratios and clock frequencies achievable for various CLKIN frequencies. Table 1000 assumes a CLKIN frequency of 400 MHz. Table 1001 assumes a CLKIN frequency of 533 MHz. Table 1002 assumes a CLKIN frequency of 600 MHz. Table 1003 assumes a CLKIN frequency of 677 MHz. Table 1004 assumes a CLKIN frequency of 800 MHz.

Referring to Table 1000, a fixed CLKIN frequency of 400 MHz is shown in the upper left corner. Table 1000 shows a range of gear ratios and PCLK frequencies supported for a CLKIN frequency of 400 MHz. Values of N are shown in the leftmost column, namely 1-8. Values of M are shown in the top row to the right of the CLKIN frequency, namely 1-8. Using our previous example of a ⅖ gear ratios, where N=2 and M=5, the PCLK frequency of 160 MHz is found at the intersection of the M=2 column and the N=5 row. The divided clock frequency is the number to the immediate right of N=5, or 80 MHz.

A system designer, given a particular frequency available for PCLK (which in our examples is the slower of the two clock frequencies), has a wide range of available clock frequencies to design with (which, in our examples, are clock frequencies higher than the frequency of PCLK). For example, if a 167 MHz part is desired to operate in the system with the 400 MHz part, a 3/7 gear ratio and a 2/5 gear ratio are applicable. With the 3/7 gear ratio, a common clock frequency of 57.1 can be used for phase alignment. In this case, the slower part can run at 171.4 MHz (somewhat faster than 167 MHz), and the faster part can run at 399.93 (somewhat slower than 400 MHz). With the 2/5 gear ratio, a common clock frequency of 80 MHz can be used for phase alignment. In this case, the slower part can run at 160 MHz (somewhat slower than 167 MHz), and the faster part can run at 400 MHz. Such variations in frequency are typically not consequential. In this embodiment, a system design is given at least one predetermined clock frequency, such as the 400 MHz CLKIN frequency of Table 1000. There is a direct ratio relationship between the fixed clock frequency and other possible clock frequencies. That is, N/M is the actual ratio of the clock frequencies. Given that the values of the respective clock frequencies are allowed to vary inconsequentially from a nominal value in some cases, a greater number of clock frequencies are available for system design given a particular fixed clock frequency.

Although the invention has been described with reference to specific exemplary embodiments thereof, it will be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for transferring data across a clock domain boundary in an electronic system, the method comprising:
    dividing a first clock in a first clock domain by a programmable value of N to yield a first common clock with a common clock frequency;
    dividing a second clock in a second clock domain by a value of M to yield a second common clock with the common clock frequency;
    determining at least one sampling edge of the first clock on which to sample data transferred across the clock domain boundary, wherein the at least one sampling edge of the first clock occurs while data from the second clock domain is valid; and
    generating an edge select word that specifies the at least one sampling edge for each cycle of the second clock.

2. The method of claim 1, further comprising:
    loading the edge select word in a control register of the electronic system at initialization; and
    using the edge select word to specify the at least one sampling edge of the first clock each time data is transferred across the clock domain boundary.

3. The method of claim 1, wherein the edge select word is one-hot encoded such that a binary bit with a particular value represents a sampling edge of the first clock.

4. The method of claim 1, wherein dividing the first clock by the programmable value of N comprises:
    in response to a reset pulse, resetting N clock signals; and
    on a first active edge of the first clock following the reset pulse, propagating N successive divide-by-N clocks using the N clock signals, wherein each of the successive divide-by-N clocks has a frequency that is 1/N times the first clock frequency and is delayed with respect to a preceding divide-by-N clock by one cycle of the first clock.

5. An electronic system comprising:
    a first component that operates according to a first clock signal that has a first frequency;
    a second component coupled to the first component, wherein the second component operates according to a second clock signal that has a second frequency that is lower than the first frequency; and
    a system input/output ("I/O") component coupling the first component to the second component, the I/O component comprising,
        a data buffer coupled to the second component, wherein the data buffer operates at the second frequency;
        a serializer-deserializer ("SERDES") coupled to the first component that operates at the first frequency;
        a control register coupled to the SERDES and to store an edge select word;
        a divide-by N circuit configured to generate N successive divided-by-N clock signals, wherein each of the N successive divided-by-N clock signals has a frequency of 1/N times the first frequency and is delayed with respect to a previous one of the N successive divided-by-N clock signals; and
        an edge select circuit coupled to the SERDES and to the control register, wherein the edge select circuit to receive the N successive divided-by-N clock signals and the edge select word and to generate an edge select signal, wherein the edge select signal is received by the SERDES, and wherein the edge select signal specifies a sampling edge of the first clock signal on which to sample data from the second component.

6. The system of claim 5, wherein the I/O component further comprising a divide-by-M circuit configured to generate a divided-by-M clock signal that has a frequency that is 1/M times the second frequency.

7. The system of claim 6, wherein the N successive divided-by-N clock signals and the divided-by-M clock signal have a common clock frequency such that there are N cycles of the first clock signal in one cycle of the common clock frequency and M cycles of the second clock signal in one cycle of the common clock frequency, and wherein the edge select word is one-hot encoded to indicate at least one sampling edge of the first clock signal within one cycle of the common clock frequency on which to sample data from the second component.

8. The system of claim 5, wherein the first component comprises a memory component, and wherein the second component comprises a system component that requests access to the memory component.

9. The system of claim 5, wherein the SERDES receives parallel data from the data buffer when the edge select signal is active and transmits the data in serial to the first component.

10. The system of claim 5, wherein the divide-by-N circuit is further configured to receive a reset signal that initiates the generation of the N successive divided-by-N clock signals, wherein the reset signal has a known relationship to the divided-by-N clock signals such that sampling edges of the first clock signal have a fixed relationship to the second clock signal.

11. The system of claim 5, wherein the control register is further configured to store a div_select word that specifies a value of N, and wherein the divide-by-N circuit is further configured to receive the div_select word.

12. The system of claim 5, wherein the edge select circuit comprises a transmit edge select circuit and a receive edge select circuit, and the edge select word comprises a transmit edge select word and a receive edge select word, wherein the transmit edge select circuit receives the transmit edge select word and generates a transmit edge select signal, and the receive edge select circuit receives the receive edge select word and generates a receive edge select signal.

13. An input/output ("I/O") component in a system that includes multiple clock domains, the I/O component comprising:
- a first data storage element to store data transmitted to and from system components that operate with a first clock signal that has a first frequency;
- a second data storage element coupled to the first data storage element, wherein the second data storage element to store data transmitted to and from system components that operate with a second clock signal that has a second frequency, and wherein the first frequency is a multiple of the second frequency;
- a control register to store control data, including an edge select word that specifies at least one sampling edge of the first clock signal on which to sample data from the second data storage element within one cycle of the second clock signal, wherein the edge select word is loaded into the control register on system initialization;
- a divide-by-N circuit configured to generate at least one divided-by-N clock signal from the first clock signal;
- a divide-by-M circuit configured to generate a divided-by-M clock signal from the second clock signal, wherein the at least one divided-by-N clock signal and the divided-by-M clock signal have a common frequency;
- a phase detect circuit to receive one of the at least one divided-by-N clock signals and the divided-by-M clock signal and detects any phase difference between one of the at least one divided-by-N clock signals and the divided-by-M clock signal; and
- a phase alignment circuit to phase align one of the at least one divided-by-N clock signals and the divided-by-M clock signal.

14. The I/O component of claim 13, wherein the first data storage element comprises a serializer-deserializer ("SERDES") to receive parallel data from the second data storage element according to the edge select word and to transmit serial data from the first data storage element at the first clock frequency.

15. The I/O component of claim 14, further comprising an edge select circuit coupled to the control register, wherein the edge select circuit to receive the edge select word and to generate an edge select signal received by the SERDES.

16. The I/O component of claim 15, wherein the edge select word is a one-hot encoded word that specifies sampling edges of the first clock signal, and wherein the edge select signal is a pulse that occurs concurrently with the specified sampling edges.

17. The I/O component of claim 13, wherein the control data further comprises a div_sel word that indicates a value of N, wherein the div_sel word is loaded into the control register on system initialization, and wherein the div_sel word is received by the divide-by-N circuit during system operation.

18. The I/O component of claim 13, wherein the I/O component comprises a memory controller and a memory interface.

19. A machine-readable storage medium having executable instructions stored thereon, which when the instructions are executed in an electronic system, perform a method comprising:
- dividing a first clock in a first clock domain by a programmable value of N to yield a first divided clock with a common clock frequency;
- dividing a second clock in a second clock domain by a value of M to yield a second divided clock with the common clock frequency;
- determining at least one sampling edge of the first clock on which to sample data transferred across a clock domain boundary between the first clock domain and the second clock domain, wherein the at least one sampling edge of the first clock occurs while data from the second clock domain is valid; and
- generating an edge select word that specifies the at least one sampling edge of the first clock.

20. The method of claim 19, further comprising:
- loading the edge select word in a control register of the electronic system at initialization; and
- using the edge select word to specify the at least one sampling edge of the first clock each time data is transferred across the clock domain boundary.

21. The method of claim 19, wherein the edge select word is one-hot encoded such that a binary bit with a particular value represents a sampling edge of the first clock.

22. The method of claim 19, wherein dividing the first clock by the programmable value of N comprises:
- in response to a reset pulse, resetting N clock signals; and
- on a first active edge of the first clock following the reset pulse, propagating N successive divide-by-N clocks using the N clock signals, wherein each of the successive divide-by-N clocks has a frequency that is 1/N times the first clock frequency and is delayed with respect to a preceding divide-by-N clock by one cycle of the first clock.

* * * * *